Patented Nov. 15, 1949

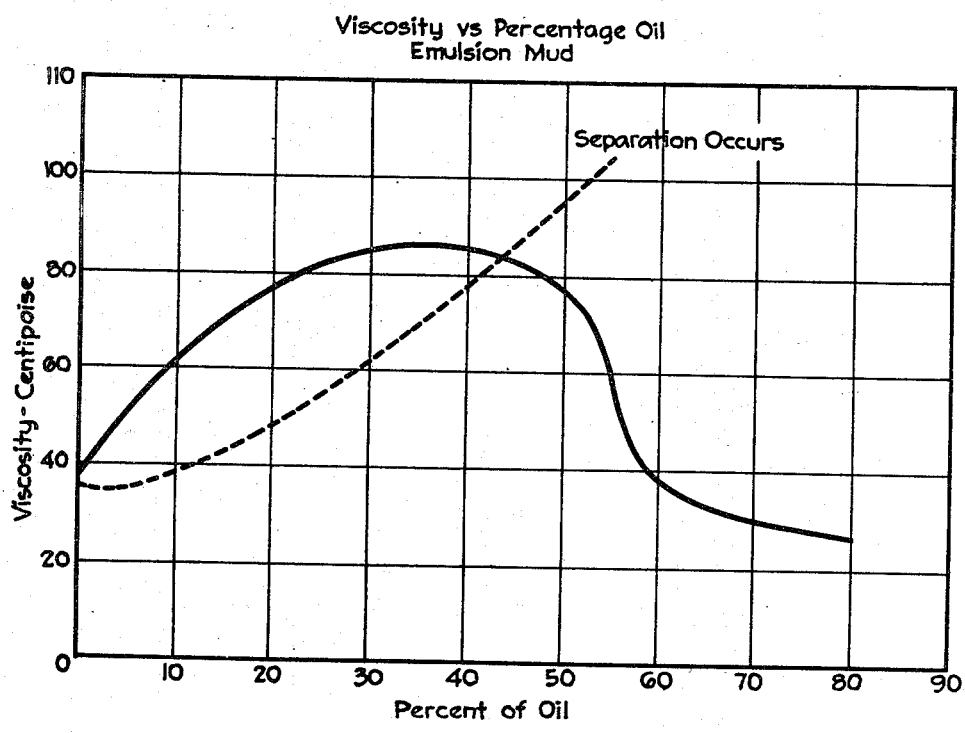

2,488,304

UNITED STATES PATENT OFFICE 2,488,304

EMULSION FLUID FOR DRILLING WELLS

Raymond Andrew Malott, Sunset Beach, Calif., assignor to Shell Development Company, San Francisco, Calif., a corporation of Delaware Application February 10, 1947, Serial No. 727,642

4 Claims. (Cl. 252—8.5)

This invention relates to the drilling of oil and gas wells and pertains more particularly to the use and composition of an improved drilling fluid.

Drilling fluids or muds are generally used when drilling wells by the rotary method. These muds are usually pumped down through the drill stem of the rotary rig and around the drill bit, returning to the surface through the annular passage between the drill stem and the well casing. Drilling fluids, circulated in this manner during the operation of drilling, fulfill the various functions of carrying cuttings to the surface of the well, cooling and lubricating the drilling tools, sealing the walls of the borehole, preventing the settling of the cuttings around the drill bit, and supplying a static head to overcome pressures encountered during the drilling operations that tend to blow the fluid from the borehole.

Formerly, most of the drilling fluids were either of the water-base or oil-base type depending on whether they employed water or oil (or a non-aqueous liquid) as a suspending medium or component. Of more recent development is a class of drilling fluids known as drilling emulsions wherein water is emulsified with oil to form the suspending medium.

A prime requisite of a satisfactory drilling emulsion or fluid is that is possess good plastering or sheath-forming characteristics, that is, it must form on the walls of the borehole a mud-sheath effectively preventing any appreciable fluid loss to the formation. Any substantial loss of fluid to the formation is undesirable at any time during the drilling, being especially dangerous and objectionable when drilling through heaving formations such as shale, or when drilling into the producing zone, which may be contaminated and plugged by said fluid.

Although the use of drilling emulsions has been found in general satisfactory, these emulsions are yet possessed of several drawbacks which impair their effectiveness.

Thus, it has been noted that fluid losses when using drilling emulsions were sometimes higher than desirable. Attempts to improve the plastering properties of drilling emulsions by increasing the percent of the oil emulsified therein resulted in unduly raising the viscosity of said emulsions.

It has also been noted the plastering and other properties of drilling emulsions unfavorably affected by the high temperatures prevailing in wells, and by the admixture thereto of brine or other contaminating matter.

It has now been found that these drawbacks can be eliminated, and several other desirable objects achieved by forming drilling emulsions with the addition thereto of small quantities of starch.

It is therefore an object of this invention to provide a starch-containing drilling emulsion having greatly improved plastering properties.

Whereas the liquid lost by a straight emulsion mud to the formation is primarily water, a further object of the present invention is to provide a starch-containing drilling emulsion which loses only small quantities of liquid to the formation, with the liquid lost containing oil in the same proportion as it exists in the original mud.

It is also an object of this invention to provide a starch-containing mud which permits the amount of oil emulsified in the water layer to be increased without increasing the viscosity of said emulsion to an undesirable value.

A further object of the present invention is to provide a starch-containing mud which is neither impaired by high temperatures nor affected by brine contamination to the extent of ordinary drilling fluids.

Although the oil present in a starch-containing drilling emulsion of the present invention tends to retard the fermentation of the starch, it is also an object of this invention to prevent such fermentation by the addition of various preservatives or maintenance of high pH or salinity.

These and other objects of this invention will be understood from the following detailed description of the invention and from the accompanying drawing, wherein viscosity versus percentage of oil is plotted for two emulsion muds; one being a typical drilling mud, the other being a starch emulsion mud according to the present invention.

The term oil and water emulsions, as used here, includes two general types of emulsions; oil-in-water and water-in-oil. The present invention is concerned with both, although oil-in-water emulsions, where the oil is present in the dispersed phase while the water forms the continuous phase, are especially preferred for the purposes of this invention.

The preferred method of carrying out the process of the present invention comprises adding a starch paste to water or a water-base drilling fluid to form a starch-water mud which is then emulsified by the addition of oil to form an oil-water-starch emulsion. This method of mixing is preferred as the starch is allowed to hydrate before the addition of oil. However, if desired, the oil may be first emulsified with a water-base mud before the starch is added. The use of a conventional jet mixer or mud gun is satisfactory in forming the emulsion. Mixing of the emulsion is done preferably at normal flow line temperature when a gelatinized starch is used. When starch is used that is not gelatinized, it may be made into a paste or slurry with water, for example, with about two parts of water to one part of starch, which starch paste is heated for some time, such as ten to twenty minutes or more, at a temperature above about 50° C. and preferably around 70° C. and then mixed with an oil and water emulsion.

The starch may be from any suitable source such as sago, tapioca, soya-bean, corn, potato, etc., and may be modified or unmodified, such as the thin boiling types. The term "starch" is used herein to include products comprising a material proportion of starch, or starchy substances, which may be obtained by suitably processing or grinding the products listed above or other suitable starch-containing products. Although the oil in the present emulsions tends to retard the fermentation of the starch, it is desirable to add a preservative or fermentation inhibitor such as creosote, benzene, benzoic acid, mercuric iodide, soluble metal chromates, arsenates and arsenites, salicylic acid, zinc iodide, carbon disulfide, phenols, cresols, etc., usually in amounts of from less than 1% to 15% or more based on the weight of the starch, to drilling emulsions which have been mixed according to the present invention in order to prevent deterioration of the imparted properties due to fermentation of the starch. The starch can also be preserved by maintaining a high pH or salinity in the mud.

Drilling emulsions may comprise several components which commonly include a suspending component or medium, a suspended component, a plastering agent and an emulsifying or stabilizing agent. The suspending medium in the case of an emulsion of the present invention is formed of oil and water, said oil preferably constituting from 30 to 80% by weight of the mixture and being present in the form of any suitable non-aqueous liquid such as Diesel oil, fuel oil, crude oil, kerosene, stove oil and the like. A suspended component in the form of a weighting material is commonly included in order to add weight to the drilling emulsion so that the hydrostatic head of the emulsion in the drill hole is great enough to overcome any formation pressures encountered during drilling operations. Weighting materials commonly used are clay, crushed oyster shells, barites, magnetite, etc. A plastering agent such as blown asphalt, clay, bentonite or starch is used to seal the porous walls of a borehole by forming a sheath of mud thereon. Emulsifying and stabilizing agents used are soaps of tall oil, soaps of fatty acids, soaps of lignosulfonic acids, starch, sodium alginates, etc.

In the present invention the starch acts both as a plastering agent and as an emulsifying agent. However, it also forms oil-water-starch drilling emulsions possessing excellent sheath-forming characteristics when used in a mud together with another plastering agent such as blown asphalt or with another emulsifying agent such as a tall oil soap. The amount of starch added may vary from 1% to 5% or more based on the weight of the drilling mud.

TABLE I

*Baroid Tester*
*Pressure: 100 lbs./sq. in.*
*Temperature: 70° F.*

| Drilling Fluid | Composition | | | Filter Loss cc/hr. | Cake Thickness, Inches |
|---|---|---|---|---|---|
| | Water-Clay Suspension | Mineral Oil With 2% Tall Oil Soap | Starch With 10% Preservative | | |
| | Parts by Volume | Parts by Volume | Parts by Weight | | |
| #1 | 100 | 0 | 0 | 13.5 | 3/32 |
| #2 | 100 | 0 | 2.25 | 7.0 | 3/32 |
| #3 | 75 | 25 | 2.25 | 3.5 | 2/32 |

TABLE II

*Baroid High Pressure Tester*
*Pressure: 1000 lbs./sq. in.*
*Temperature: 130° F.*

| Drilling Fluid | Composition | | | Filter Loss cc./15 m. | | | Cake Thickness |
|---|---|---|---|---|---|---|---|
| | Water-Clay Suspension | Mineral Oil With 2% Tall Oil Soap | Starch With 10% Preservative | Total | Water | Oil | |
| | Parts by Volume | Parts by Volume | Parts by Weight | | | | |
| #4 | 75 | 25 | 0 | 4.9 | 4.3 | 0.6 | 2/32 |
| #2 | 100 | 0 | 2.25 | 5.0 | 5.0 | 0 | 3/32 |
| #3 | 75 | 25 | 2.25 | 2.9 | 2.4 | 0.5 | 2/32 |

It will be seen from Table I that the filter loss with the drilling emulsions of the present invention amounts only to about one quarter of that occurring with ordinary clay drilling fluids, and to about one half of that occurring with either starch-containing water-base fluids or with emulsions not containing starch.

It will be particularly noted from comparing fluids #3 and #4, Table II, that while the addition of starch results in reducing the total fluid loss by about one half, the amount of oil lost to the formation remains approximately the same. The addition of starch thus has the particularly beneficial effect of specifically reducing the amount of water lost to the formation, which is of particular importance in preventing the contamination and plugging of a producing zone by water when drilling therethrough.

Furthermore, the addition of starch to an oil-water emulsion permits the increase of the amount of oil emulsified in the water phase without increasing the viscosity of the emulsion to an undesirable value, as will be seen from Table III and the drawing. The ability of increasing the amount of oil in the emulsion is of especial importance when drilling through heaving formations or experiencing trouble with stuck casing.

It will be seen from the drawing that the viscosity of a typical emulsion mud increases to an undesirable value with the continued addition of oil whereas a typical starch emulsion mud, of the present invention, may have a high oil content and a low viscosity. Also, it will be noted that it is possible to form a starch emulsion mud containing as much as 80% oil, while ordinary emulsion muds usually separate when formed with as much as 55% oil.

TABLE III

| Drilling Fluid | Composition | | | Viscosity, c. p. |
|---|---|---|---|---|
| | Water-Clay Suspension | Mineral Oil With 2% Tall Oil Soap | Starch | |
| | Parts by Volume | Parts by Volume | Parts by Weight | |
| #5 | 70 | 30 | 0 | 65 |
| #6 | 50 | 50 | 0 | 95 |
| #7 | 30 | 70 | 0 | Separation |
| #8 | 70 | 30 | 2.25 | 82 |
| #9 | 50 | 50 | 2.25 | 78 |
| #10 | 30 | 70 | 2.25 | 30 |

I claim as my invention:

1. A drilling fluid for wells having low fluid loss properties consisting essentially of an oil-in-water emulsion, 1 to 5 per cent of gelatinized starch and an amount of a weighting material sufficient to permit the drilling fluid to overcome well pressures, said oil-in-water emulsion containing from 55 to 80 per cent oil and from 45 to 20 per cent water by volume.

2. A drilling fluid for wells, consisting essentially of an oil and water emulsion, from 1 to 5 per cent of gelatinized starch, and an amount of finely divided solid material sufficient to permit the drilling fluid to overcome well pressures.

3. A drilling fluid for wells consisting essentially of a suspension of clay in water, a mineral oil having a water-soluble tall oil soap added thereto in amounts sufficient to emulsify said oil in said suspension, and from 1 to 5 per cent gelatinized starch added thereto.

4. The composition of claim 2, comprising an amount of an inhibitor sufficient to substantially prevent fermentation of the drilling fluid.

RAYMOND ANDREW MALOTT.

REFERENCES CITED

The following references are of record in the file of this patent:

UNITED STATES PATENTS

| Number | Name | Date |
|---|---|---|
| 2,151,029 | Henst | Mar. 21, 1939 |
| 2,350,154 | Dawson et al. | May 30, 1944 |
| 2,360,992 | Weiss | Oct. 24, 1944 |
| 2,399,986 | Chapman | May 7, 1946 |
| 2,417,307 | Larsen | Mar. 11, 1947 |
| 2,423,144 | Gregg | July 1, 1947 |

OTHER REFERENCES

Berkman and Egloff, Emulsions and Foams, published 1941, Reinhold Publishing Corp., New York, pages 29, 33, 168, and 174. (Copy in Division 64.)